March 16, 1926. 1,576,871
F. A. STEVENS
OPHTHALMIC MOUNTING
Original Filed May 15, 1922

Inventor:-
Frederick A. Stevens;
Lund Rines
Attorney;-

Patented Mar. 16, 1926.

1,576,871

UNITED STATES PATENT OFFICE.

FREDERICK A. STEVENS, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING.

Application filed May 15, 1922, Serial No. 560,957. Renewed July 10, 1925.

*To all whom it may concern:*

Be it known that I, FREDERICK ARTHUR STEVENS, a citizen of the United States, and a resident of Providence, in the county of Providence and State of Rhode Island, have invented a new and useful Improvement in Ophthalmic Mountings, of which the following is a specification.

The present invention relates to ophthalmic mountings, more particularly ophthalmic mountings comprising non-metallic members that are connected together by metal hinges, and the chief object of the invention is to provide for adjusting the relative positions of the hinged-together members. The invention has also features that are not restricted to the ophthalmic-mounting art.

Figure 1:
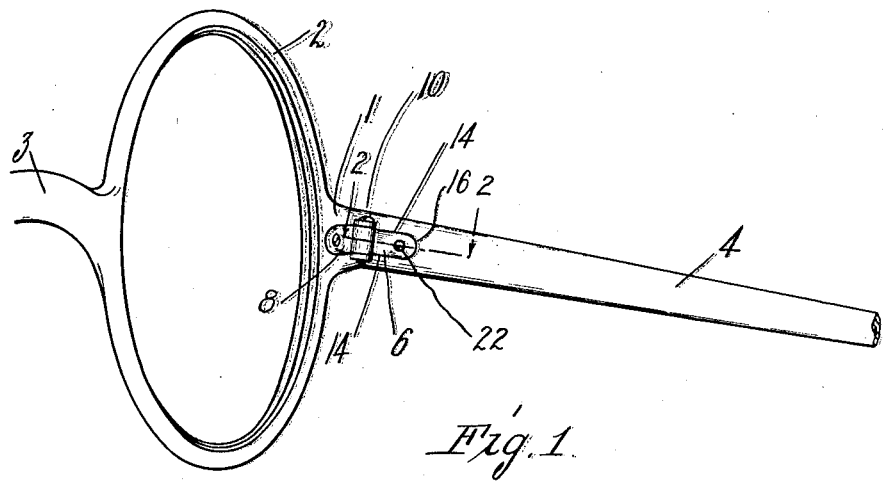
Figure 2:
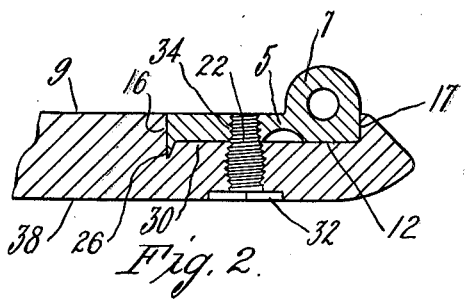
Figure 3:
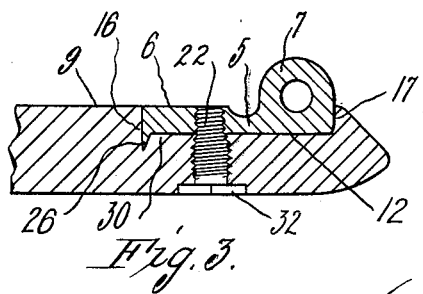
Figure 4:
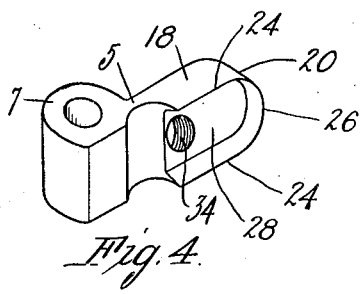
Figure 6:
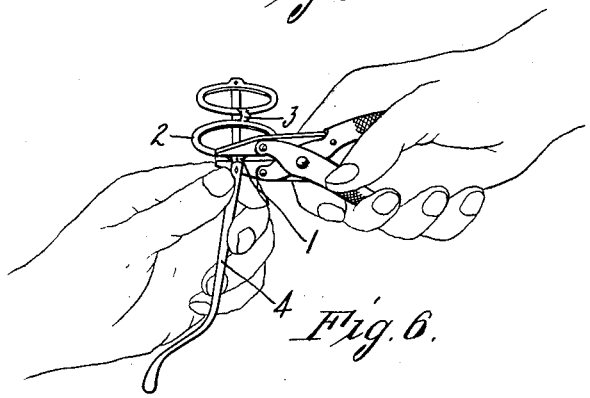
Figure 5:
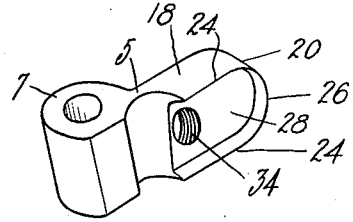

In the accompanying drawings, Fig. 1 is a fragmentary perspective view of an ophthalmic mounting of the above-described character, constructed according to a preferred embodiment of the present invention; Fig. 2 is a longitudinal section through one of the hinge plates and a temple to which it is secured, taken substantially upon the line 2—2 of Fig. 1, looking in the direction of the arrows; Fig. 3 is a similar view of a modification; Fig. 4 is a perspective view of the hinge plate shown in Fig. 2, before adjustment; Fig. 5 is a similar view of the same after adjustment; and Fig. 6 illustrates a method of adjustment.

The invention is for illustrative purposes shown in connection with a spectacle mounting comprising a lens-holding frame member 2 and temple members 4, constituted of plastic, non-metallic material like celluloid, zylonite or other composition. The temples 4 are pivotally connected to the lens-holding frame 2 by hinges comprising hinge plates 6 and 8 that are pivoted together at 10. One face 9 of each of the non-metallic members is recessed, the bottom wall of the recess 12 being substantially flat and the recess being shown provided with longitudinally extending walls 14 that may be straight and parallel, if desired, and that are connected by a transversely extending wall 16. There may be a wall 17 opposed to the wall 16 or the recess may be open-ended, as desired. The hinge plates 6 and 8 are similarly substantially flat and are provided with walls 18 that are connected by a wall 20. The hinge plates and the recesses 12 are so shaped that the hinge plates will fit tightly in the recesses, the hinge plates lying flat against the bottom flat walls of the recesses, with the walls 18 in contact with the walls 14, and the wall 20 in contact with the wall 16. The walls 14, 16, 18 and 20 are made blunt to prevent rotation or twisting of the hinge plates within the recesses 12. The hinge plates are provided with beveled wings 24 along the walls 18 and a beveled wing 26 along the wall 20 connecting the beveled wings 24. The wings 24 and 26 are continuous and offset from the inner face 28 of the hinge plate. The hinge plate, after being fitted into position in the recess 12, is forced home by pressure, causing the beveled wings to bite or wedge into, and become embedded within the non-metallic material. The non-metallic material being plastic, it becomes compressed or wedged into the channel 30, between the wings, effecting a very tight joint. The parts are held together by a single rivet or screw 22, shown screwed into the screw-threaded bore 34 of the hinge plate, and then upset by pressure applied to the opposite ends of the screw. The head 32 of the screw is thus forced into position, flush with the face 38 of the non-metallic member, and the body of the screw is caused to bulge out, Figs. 2 and 3, effecting a very tight union of the parts.

The ophthalmic mounting so far described constitutes, in itself, no part of the present invention, and the invention may be embodied as readily in mountings of other types. The essential novelty of the invention resides in an improved relative adjustment of the hinged members 2 and 4. It may be desired, for example, to have the temple 4 pivot in a plane passing through the temple end piece 1 and the bridge 3; or in a plane inclined to this plane. One way of effecting the desired result is to remove the hinge plate from the member in which it is seated, and to remount it at a different angle; but this is obviously impracticable.

According to the present invention, the position of the hinge plate is not changed, but it is bent or twisted instead to produce the desired degree of angularity between the rim member 2 and the temple member 4. The temple end piece 1 may be grasped by a pair of pliers, as shown in Fig. 6, the temple 4 may be grasped in the hand, and the required degree of twist may then be imparted by relative movement of the pliers and the temple-holding hand. By careful manipulation and proper design, neither hinge plate 6 or 8 will be torn from its setting, but a portion of the hinge plate will be bent relative to the hinge plate as a whole to produce the desired degree of twist.

Obviously this can not be done if the hinge plate is too thick; and if it is too thin, it can not be made to serve as a hinge plate at all, in practice. According to the present invention, the thickness of the hinge plate as a whole is not affected; but a portion 5 between the bore 34 and the ear 7 is reduced in thickness to render the hinge plate pliable at the reduced portion. The relatively non-pliable body portion of the hinge plate may thus be held firm as a unit with the temple 4 by the pliers, while the hinge plate is permitted to twist or bend at the reduced portion 5. The cutting away of the metal of the hinge plate may be along either face of the plate as shown in Figs. 2 and 3, or along both faces; but preferably, it is cut away along the inner face 28, because the cut-away portion is then invisible, and so does not detract from the appearance of the mounting.

The invention may obviously be modified by persons skilled in the art without departing from its spirit, and its scope is defined in the appended claims.

What is claimed as new is:—

1. A substantially flat hinge plate having a relatively non-pliable portion and a relatively pliable portion, to facilitate adjustment of the hinge plate at the relatively pliable portion.

2. In combination, a member, and a substantially flat hinge plate secured to the member having a relatively non-pliable portion and a relatively pliable portion, to facilitate adjustment of the hinge plate at the relatively pliable portion.

3. In combination, two members connected together by a metal member comprising a substantially flat hinge plate having a relatively non-pliable portion and a relatively pliable portion, to facilitate adjustment of the hinge plate at the relatively pliable portion.

4. The combination with a member constituted of plastic material having a substantially flat portion, a substantially flat metal plate held in contact with the flat portion having a projecting part biting into and embedded within the member, the plate having a relatively non-pliable portion and a relatively pliable portion, to facilitate adjustment of the hinge plate at the relatively pliable portion.

5. The combination with a member constituted of plastic material having a recess the bottom of which is substantially flat and the walls of which are blunt, of a substantially flat metal plate having blunt walls fitted tightly in the recess, and a single element extending through the plate and the member for securing the plate to the member, the plate having a relatively non-pliable portion and a relatively pliable portion, to facilitate adjustment of the hinge plate at the relatively pliable portion.

6. An ophthalmic mounting comprising a member constituted of plastic material, a substantially flat hinge plate having a portion biting into and embedded within the member, and means for securing the hinge plate to the member, the hinge plate having a relatively non-pliable portion and a relatively pliable portion, to facilitate adjustment of the hinge plate at the relatively pliable portion.

7. An ophthalmic mounting comprising a member constituted of plastic material having a substantially flat-walled recess, a substantially flat hinge plate seated within the recess, and means for securing the hinge plate to the member, the hinge plate having a relatively non-pliable portion and a relatively pliable portion, to facilitate adjustment of the hinge plate at the relatively pliable portion.

8. An ophthalmic mounting comprising a member, and a hinge plate secured to the member, an intermediate portion of the hinge plate being reduced in thickness.

9. An ophthalmic mounting comprising a member constituted of plastic material having a recess provided with longitudinally extending walls connected by a transversely extending wall, and a hinge plate seated within the recess having walls in tightly-fitted contact with the recess walls and biting into and embedded within the member, an intermediate portion of the hinge plate being reduced in thickness.

10. In combination, a member, and a substantially flat hinge plate secured to the member, an intermediate portion of the hinge plate being reduced in thickness to facilitate adjustment of the hinge plate at the portion of reduced thickness.

In testimony thereof, I have hereunto subscribed my name this 11th day of May, 1922.

FREDERICK A. STEVENS.